Figure 3:
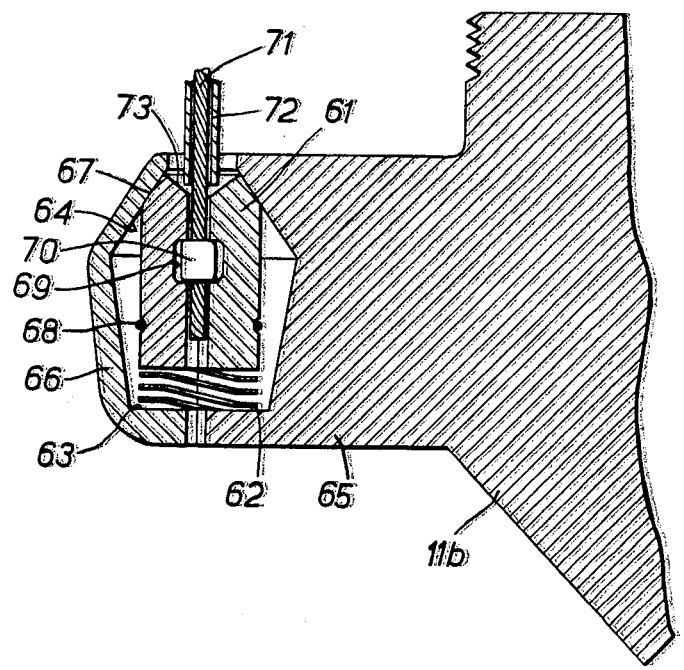

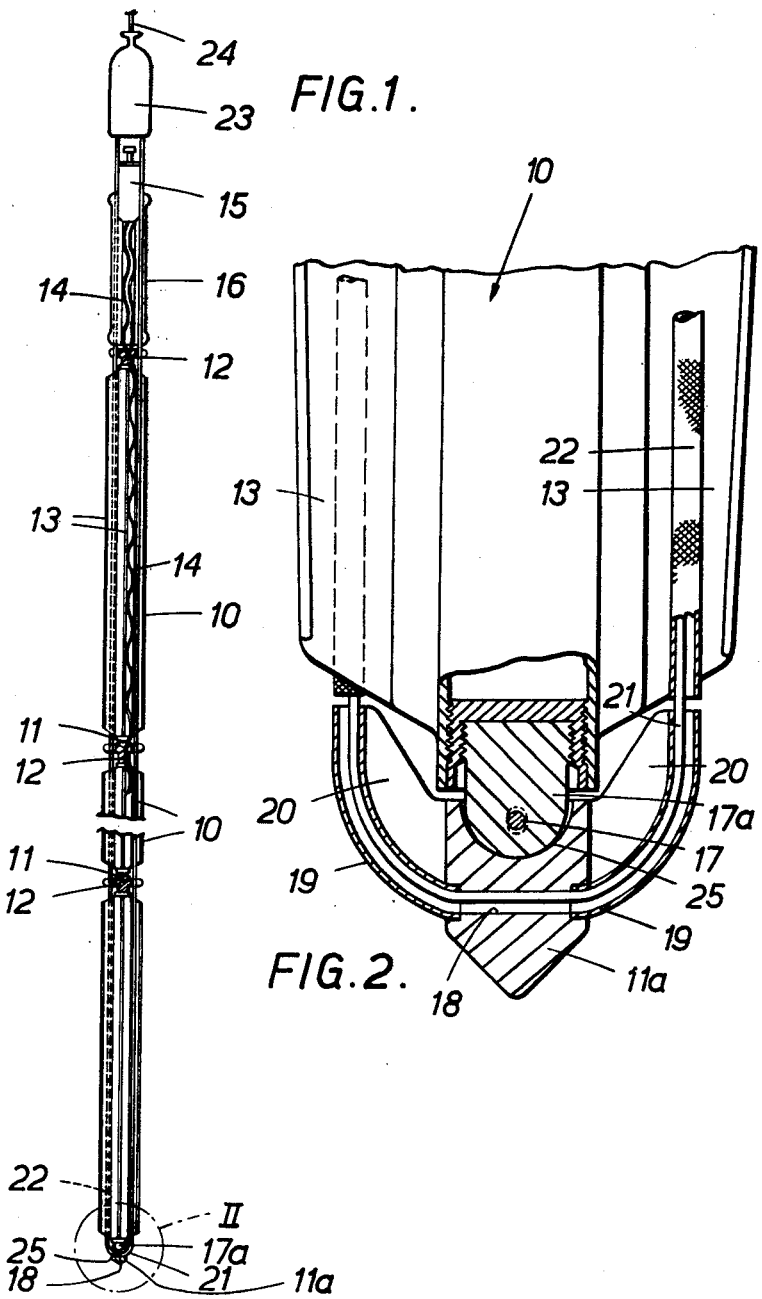

United States Patent Office 3,170,848
Patented Feb. 23, 1965

3,170,848
FUEL ELEMENTS FOR VERTICALLY ORIENTED NUCLEAR REACTORS
Alan Charles Anthony Saunders, Ribbleton, Preston, England, assignor to United Kingdom Atomic Energy Authority, London, England
Filed June 11, 1962, Ser. No. 201,435
Claims priority, application Great Britain, July 19, 1961, 26,139/61; Jan. 24, 1962, 2,610/62
5 Claims. (Cl. 176—77)

This invention relates to fuel elements for vertically-orientated nuclear reactors.

In order to operate a nuclear reactor efficiently and safely it is necessary to know the temperature of the fuel elements in the reactor and, to this end, thermocouples are attached to at least some of the fuel elements and these thermocouple carrying fuel elements are distributed throughout the reactor in different positions. Accordingly strings of fuel elements have been designed in which the fuel elements are stacked one upon another to form a column and thermocouple leads from one or more of the elements extend along the stack from which connections can be made to recording devices. Such a string of fuel elements creates a reactor charging problem since the stack must be charged as a unit to avoid breaking the thermocouple leads and to save time, yet it is preferable to discharge the elements individually because of the additional shielding required for irradiated elements.

According to the present invention a string of elongate nuclear reactor fuel elements superposed to form a column has a first flexible tube extending along the column, a second flexible tube also extending along the column on the opposite side of the column to the first flexible tube, an end fitting on the lower end of the bottom fuel element in the column, and either a lifting cable passing through the first flexible tube and then through the second flexible tube via a channel in the end fitting, or a separate lifting cable passing through each flexible tube and connecting with the end fitting by remotely releasable means, the flexible tubes and cable or cables being withdrawable from the fuel element string.

Embodiments of the invention will now be described by way of example with reference to the accompanying drawings wherein FIG. 1 is a diagrammatic view, partly sectioned, FIG. 2, on a larger scale than FIG. 1, is a side elevation, partly sectioned, of that part of FIG. 1 within the chain-dotted circle II, and FIG. 3, on a still larger scale, is a fragmentary medial section of an alternative arrangement.

FIG. 1 of the drawings shows a string of at least four elongate nuclear reactor fuel elements 10 each provided with end fittings in the form of locating cones 11 and complementary cups 12 so that the elements can be stacked one upon another to form a column. The elements have longitudinal fins 13. Thermocouple leads 14 extend from thermocouple connections on each fuel element to a connector socket 15 mounted in a spacing member 16 on top of the fuel element stack. The bottom fuel element 10 in the string has a special end fitting 11a pivotably mounted by means of a pin 17 on a stem 17a which is screwed into the end cap of the fuel element and has a spherical end 25. (This fitting 11a is shown more clearly in FIG. 2.) A passageway 18 is provided through the end fitting 11a and two curved hollow arms 19 with webs 20 are secured to the fitting so as to register with the passageway 18. A Bowden cable 21 passes through the passageway 18 and hollow arms 19 and extends along opposite sides of the fuel element string in flexible guide tubes 22 which are supported at intervals along the length of the string by brackets (not shown) attached to the fins 13. Above the connector socket 15 at the top of the string of fuel elements 10 is a yoke 23 in which the flexible tubes 22 and the ends of the Bowden cable 21 are held in position by means of an automatically releasable mechanism. A lifting wire 24 from a winding drum (not shown) is attached to the yoke 23.

To charge the string of fuel elements 10 into a channel in a nuclear reactor the assembly of fuel elements, spacing member, connector socket, flexible tubes, Bowden cable and yoke is made up and the assembly is loaded into a container which is located above the channel to which the fuel elements 10 are to be charged. The assembly is then lowered into the channel on the lifting wire 24, the Bowden cable 21 maintaining the string of fuel elements together as a column. When the fuel elements are in position in the channel one end of the Bowden cable 21 is released from the mechanism in the yoke 23 and flexible tubes 22 are then withdrawn. A connection can now be made between the connector socket 15 and instruments for recording the signals from the thermocouples on the fuel elements, and the reactor shielding can be replaced.

As an alternative to a loop of lifting cable two separate straight cables may be used, these straight cables each being secured to the lower end of the bottom fuel element in the string so that they are releasable when the string is in position in a nuclear reactor channel. The release mechanism may be operated by movement of the flexible tubes independently of the cables or by contact between the lower end of the bottom fuel element and its support at the bottom of the reactor channel. The flexible tubes and cables may be withdrawn together in these alternative arrangements. An example of a further arrangement is shown in FIG. 3 in which a split collet 61 is supported on a flat strip coil spring 62 in a cavity 63 having an inclined face 64. The cavity 63 is formed between a member 65, attached to an end-fitting 11b on the lower-most fuel element in an end-to-end stack of fuel elements as described above, and a part 66 secured to the member 65 by screws (not shown). The collet 61 has an external surface 67 and is retained in the closed position by a spring wire circlip 68 and the action of the spring 62 holding the external surface 67 against the inclined face 64 of the cavity 63. Between the two halves of the collet 61 is a recess 69 which houses a ferrule 70 formed on the end of a load-bearing cable 71 having an outer casing 72 which can enter a cut-away part 73 on top of the split collet 61. The diameter of the ferrule 70 is such that it is intermediate between the internal and external diameter of the casing 72.

The fuel element is suspended from the cable 71 by enclosing the ferrule 70 in the recess 69 in the collet 61. To release the ferrule 70 when the element is brought to rest at the bottom of a fuel element channel the outer casing 72 is pressed against the cut-away part 73 of the collet 61 so that the collet is depressed and the two halves of the collet slide along the face 64 of the cavity 63 opening up at the same time to release the ferrule. The cable 71 can then be withdrawn by pulling on it and as this is done the ferrule closes up on the outer casing 72 which is thereafter withdrawn with the cable.

It is an advantage of this form of release mechanism that it does not operate until the fuel element is actually at rest at the bottom of a channel.

I claim:
1. A string of elongate nuclear reactor fuel elements superposed to form a column having a first flexible tube extending along the column, a second flexible tube also extending along the column on the opposite side of the column to the first flexible tube, an end fitting on the lower end of the bottom fuel element in the column, and a lifting cable passing through the first flexible tube and then through the second flexible tube via a passageway in the end fitting, the flexible tubes and cable being withdrawable from the fuel element string.

2. A string of elongate nuclear reactor fuel elements superposed to form a column having a first flexible tube extending along the column, a second flexible tube also extending along the column on the opposite side of the column to the first flexible tube, an end fitting on the lower end of the bottom fuel element in the column and a lifting cable passing through each flexible tube and connecting with the end fitting by remotely releasable means, the flexible tubes and cables being withdrawable from the fuel element string.

3. A string of elongate nuclear reactor fuel elements according to claim 2 wherein the means connecting the cables with the end fitting are releasable, after load on the cable is relieved, by movement of an outer casing for the cable.

4. A string of elongate nuclear reactor fuel elements according to claim 2 wherein the end fitting is mounted on the fuel element so as to be pivotable about a horizontal axis.

5. A string of elongate nuclear fuel elements superposed to form a column having a first flexible tube extending along the column, a second flexible tube extending also along the column on the opposite side of the column to the first flexible tube, an end fitting on the lower end of the bottom fuel element in the column and cable lifting means passing through said tubes to lift said column and said fitting, said means and said tubes being withdrawable from said fuel element string.

References Cited in the file of this patent
UNITED STATES PATENTS

| | | |
|---|---|---|
| 2,985,575 | Dennis et al. | May 23, 1961 |

FOREIGN PATENTS

| | | |
|---|---|---|
| 232,446 | Australia | Jan. 24, 1961 |
| 826,228 | Great Britain | Dec. 31, 1959 |
| 1,214,056 | France | Nov. 2, 1959 |